(12) United States Patent
Moestam et al.

(10) Patent No.: US 10,895,228 B2
(45) Date of Patent: Jan. 19, 2021

(54) FUEL EJECTOR ASSEMBLY FOR A VEHICLE

(71) Applicant: Ningbo Geely Automobile Research & Development Co., Ltd., Ningbo (CN)

(72) Inventors: Robert Moestam, Växjö (SE); Erik Fredholm, Billdal (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 16/679,176

(22) Filed: Nov. 9, 2019

(65) Prior Publication Data

US 2020/0070648 A1 Mar. 5, 2020

Related U.S. Application Data

(63) Continuation of application No. PCT/CN2018/084127, filed on Apr. 23, 2018.

(30) Foreign Application Priority Data

May 18, 2017 (EP) ..................................... 17171713

(51) Int. Cl.
*B60K 15/03* (2006.01)
*F02M 37/10* (2006.01)
*F02M 37/00* (2006.01)

(52) U.S. Cl.
CPC ......... *F02M 37/0094* (2013.01); *B60K 15/03* (2013.01); *F02M 37/0017* (2013.01); *F02M 37/103* (2013.01); *B60K 2015/03243* (2013.01)

(58) Field of Classification Search
CPC .......... B60K 15/03; B60K 2015/03243; F02M 37/0017; F02M 37/103; F02M 37/0094
USPC .......................................... 123/509; 137/571
See application file for complete search history.

(56) References Cited

U.S. PATENT DOCUMENTS

| 5,133,324 A | * | 7/1992 | Michiaki | .............. | F02M 37/025 |
| | | | | | 123/510 |
| 6,341,623 B1 | * | 1/2002 | Channing | ............ | B60K 15/077 |
| | | | | | 123/514 |
| 7,946,829 B2 | * | 5/2011 | Akiyama | .................. | F04F 5/44 |
| | | | | | 123/509 |

(Continued)

FOREIGN PATENT DOCUMENTS

| CN | 1519468 A | 8/2004 |
| CN | 103061929 A | 4/2013 |

(Continued)

OTHER PUBLICATIONS

International Search Report and Written Opinion from corresponding International Patent Application No. PCT/CN2018/084127, dated Jul. 25, 2018, 10 pages.

(Continued)

*Primary Examiner* — Mahmoud Gimie
(74) *Attorney, Agent, or Firm* — Tucker Ellis LLP (57) ABSTRACT

A fuel ejector assembly for a vehicle. A second fluid passage extends into a first fluid passage so that a nozzle opening is arranged inside the first fluid passage facing an outlet flow port such that a first flow of fuel in the first fluid passage flows around the nozzle opening. A flow shape unit is disposed within the first fluid passage in connection to the nozzle opening.

13 Claims, 3 Drawing Sheets

(56) References Cited

U.S. PATENT DOCUMENTS

| | | | |
|---|---|---|---|
| 10,682,908 B1 * | 6/2020 | Taba | B60K 15/077 |
| 2001/0023687 A1 | 9/2001 | Ushigome | |
| 2005/0178367 A1 * | 8/2005 | Wolters | F02D 33/006 |
| | | | 123/514 |
| 2005/0183781 A1 * | 8/2005 | Vitalis | F02M 37/106 |
| | | | 137/565.22 |
| 2006/0076287 A1 * | 4/2006 | Catlin | F02M 37/025 |
| | | | 210/416.4 |
| 2007/0151609 A1 * | 7/2007 | Dickenscheid | B60K 15/077 |
| | | | 137/565.22 |
| 2008/0190495 A1 | 8/2008 | Markefka | |
| 2009/0223492 A1 * | 9/2009 | Leppert | F02M 37/0029 |
| | | | 123/509 |

FOREIGN PATENT DOCUMENTS

| | | | |
|---|---|---|---|
| CN | 105317599 A | | 2/2016 |
| DE | 102010019449 A1 | | 11/2010 |
| EP | 0597175 A1 | | 5/1994 |
| EP | 0754851 A1 | | 1/1997 |
| JP | 2007321584 A | | 12/2007 |
| KR | 20130040597 A | * | 4/2013 |
| WO | 2010053045 A1 | | 5/2010 |
| WO | 2011071440 A1 | | 6/2011 |

OTHER PUBLICATIONS

Extended European Search Report from corresponding European Patent Application No. 17171713.5, dated Nov. 7, 2017, 5 pages.

* cited by examiner

FUEL EJECTOR ASSEMBLY FOR A VEHICLE

RELATED APPLICATION DATA

This application is a continuation of International Patent Application No. PCT/CN2018/084127, filed Apr. 23, 2018, which claims the benefit of EP 17171713.5, filed May 18, 2017, the disclosures of which are incorporated herein by reference in their entireties.

TECHNICAL FIELD

The present disclosure relates to a fuel ejector assembly for a vehicle, where the fuel ejector assembly typically is implemented in a vehicle fuel system. The disclosure further relates to a fuel tank system comprising a fuel ejector assembly, a method for ejecting fuel in a fuel tank system, and a vehicle comprising a fuel ejector assembly.

Although the disclosure will be described in relation to a car, the disclosure is not restricted to this particular vehicle, but may as well be installed in other type of vehicles such as minivans, recreational vehicles, off-road vehicles, and heavy-duty vehicles, such as trucks, buses and construction equipment.

BACKGROUND

Vehicle engines, in particular petrol and diesel fuel-powered combustion engines but also other engines, are typically connected to a fuel system including a fuel tank and other components, such as for example a fuel pump and fuel lines, which components are configured to provide fuel to the engine or engine system.

Some fuel tank systems may include a fuel ejector assembly for distributing the fuel in the fuel tank in an efficient way. This is especially of high importance if the fuel tank is of the saddle-tank type used in modern vehicles, where the fuel tank comprises two fuel tank compartments connected to each other. In order to secure that the fuel pump can transport fuel to the engine, the fuel ejector can distribute the fuel between the fuel tank compartments so that the fuel pump can operate in a satisfactory manner. If the fuel pump is arranged in an inner fuel tank cup inside the fuel tank, a fuel ejector assembly can also be used to distribute fuel from the fuel tank compartment to the inner fuel tank cup when needed.

A fuel tank system comprising the fuel ejector assembly may be designed in several different ways, and the fuel ejector assembly typically includes a nozzle or similar arrangement to raise the flow velocity of the fuel flowing through the fluid passages of the fuel ejector. There are several different ways to arrange the fuel ejector assembly in the fuel tank system to control the flow between the fuel tank compartments, which solutions partly depend on the design of the engine system and the fuel tank system.

It is desired to have a fuel ejector solution with a high efficiency in order to minimize the energy used to transport fuel between the compartments of the fuel tank. With an efficient fuel ejector solution, the total amount of emissions from the vehicle can be lowered, and it would be beneficial to improve the fuel ejectors used today. It would also be beneficial if an improved fuel ejector assembly can be installed in known or commercially available vehicles without substantial changes to the fuel system, while enabling an efficient transport of fuel between the fuel tank compartments during operation of the vehicle.

SUMMARY

An object of the present disclosure is to provide an improved fuel ejector assembly for a vehicle, a fuel tank system, and a method for ejecting fuel, where the previously mentioned problems are avoided. In particular, an object of the present disclosure is to provide an efficient fuel ejector assembly for a vehicle. This object is at least partly achieved by the features of the independent claims. The dependent claims contain further developments of the fuel ejector assembly and the fuel tank system.

By providing a fuel ejector assembly including a configuration as mentioned above, it becomes possible to improve existing operations of the fuel system. In particular, the present disclosure provides a fuel ejector assembly capable of efficiently controlling the flow of fuel between the fuel tank compartments. The advantages described above are also believed to further contribute to better meet prevailing regulations with regards to exhaust and fuel emissions. As such, the example embodiments of the present disclosure are capable of improving the general performance of the fuel ejector assembly.

The disclosure concerns a fuel ejector assembly for a vehicle, comprising a first fluid passage having an inlet flow port and an outlet flow port in fluid communication with each other, enabling a first flow of fuel to flow in the first fluid passage. Further, a second fluid passage is connected to the first fluid passage, where the second fluid passage has a suction flow port, arranged outside the first fluid passage, and a nozzle opening. The suction flow port and the outlet flow port are in fluid communication with each other, wherein the suction flow port is connectable to a fuel tank suction passage enabling a second flow of fuel to flow in the second fluid passage from the fuel tank suction passage via the suction flow port to the outlet flow port. A flow shape unit is disposed within the first fluid passage between the inlet flow port and the outlet flow port, where the flow shape unit is configured to raise the flow velocity of the first flow of fuel flowing in a direction from the inlet flow port to the outlet flow port when a first pressure level is applied to the inlet flow port, thereby subjecting the second fluid passage to a second pressure level, which is lower than the first pressure level. The second fluid passage is extending into the first fluid passage so that the nozzle opening is arranged inside the first fluid passage facing the outlet flow port such that the first flow of fuel in the first fluid passage is flowing around the nozzle opening. The flow shape unit is disposed within the first fluid passage in connection to the nozzle opening.

Advantages with these features are that, with this type of fuel ejector assembly, fuel can be efficiently distributed within the tank system of the vehicle. The flow established around the nozzle opening will create a low second pressure level so that fuel can efficiently be sucked into the fuel ejector assembly, where at the same time the energy consumption needed for the first flow of fuel in the first fluid passage is low. Further, the fuel ejector assembly can be installed in a known or commercially available vehicle without substantial changes to the fuel system or fuel tank system, while enabling an efficient distribution of fuel between the fuel tank compartments during operation of the vehicle.

According to an aspect of the disclosure, the first flow of fuel in the first fluid passage is flowing around the nozzle opening along an inner wall of the first fluid passage. In this way, the flow is efficiently distributed in the fuel ejector assembly for an efficient distribution of fuel in the fuel tank system.

According to another aspect of the disclosure, the nozzle opening has an essentially circular cross-sectional shape and the inner wall of the first fluid passage has an essentially circular cross-sectional shape, so that the first flow of fuel in the first fluid passage is flowing essentially annularly around the nozzle opening in a direction along the first fluid passage from the inlet flow port towards the outlet flow port. The annular shape of the flow will further increase the efficiency of the fuel ejector assembly, so that the fuel is efficiently distributed in the fuel tank between the fuel tank compartments.

According to an aspect of the disclosure, the flow shape unit comprises a converging part, configured to raise the flow velocity of the first flow of fuel from the inlet flow port to the outlet flow port. The converging part is used for establishing the low pressure level in the second fluid passage when the velocity of the first flow of fuel in the first fluid passage is raised.

According to a further aspect of the disclosure, the converging part is formed by an end portion of the second fluid passage extending into the first fluid passage. In this way, the end portion of the second fluid passage is used for establishing the converging part, which provides a simple and reliable construction.

According to another aspect of the disclosure, the converging part is formed by a pipe contraction within the first fluid passage. This gives an alternative way to construct the converging part, which provides flexibility in the shaping of the flow of fuel around the nozzle opening.

According to further aspects of the disclosure, the flow shape unit comprises a diverging part arranged in the flow direction after the converging part, where the diverging part can be formed by a pipe expansion within the first fluid passage. The diverging part establishes an efficient flow through the fuel ejector assembly in order to distribute the fuel in the fuel tank.

According to a further aspect of the disclosure, the fuel ejector assembly is an assembled single unit. With a single unit, the fuel ejector assembly is easy to install in the vehicle, also in known or commercially available vehicles without substantial changes to the fuel system or fuel tank system, while enabling an efficient distribution of fuel in the fuel tank during operation of the vehicle.

The disclosure further concerns a fuel tank system for a vehicle, comprising a first fuel ejector assembly as described above having an inlet flow port, an outlet flow port and a suction flow port. A fuel tank for storing fuel comprises a first fuel tank compartment in fluid communication with a second fuel tank compartment, where the first fuel ejector assembly is arranged in the second fuel tank compartment for transporting fuel from the second fuel tank compartment to the first fuel tank compartment. A fuel pump is arranged in the fuel tank for pumping fuel to an engine system of the vehicle via an engine fuel line. A high pressure fuel line connected to the fuel pump and the inlet flow port is establishing fluid communication between the fuel pump and the inlet flow port. An outlet fuel line connected to the outlet flow port is establishing fluid communication between the outlet flow port and the first fuel tank compartment. A fuel tank suction passage connected to the suction flow port is establishing fluid communication between the second fuel tank compartment and the suction flow port.

Advantages with this type of fuel tank system are that fuel can be efficiently distributed within the tank system of the vehicle, where at the same time the energy consumption needed for the first flow of fuel in the first fluid passage is low. Further, the fuel ejector assembly can be installed in a known or commercially available vehicle without substantial changes to the fuel system or the fuel tank system, while enabling an efficient distribution of fuel between the fuel tank compartments during operation of the vehicle.

According to an aspect of the disclosure, the first fuel tank compartment is connected to the second fuel tank compartment via a bridge having a first end part and a second end part, where the first fuel tank compartment and the second fuel tank compartment are in fluid communication with each other via the bridge. The first end part is connected to a first upper part of the first fuel tank compartment, and the second end part is connected to a second upper part of the second fuel tank compartment.

According to another aspect of the disclosure, the fuel tank system further has a second fuel ejector assembly as described above, where the second fuel ejector assembly is arranged in the first fuel tank compartment for transporting fuel from the first fuel tank compartment to an inner fuel tank cup arranged within the first fuel tank compartment. The fuel pump is arranged in the inner fuel tank cup. Through the use of two fuel ejector assemblies, the distribution of fuel in the fuel tank can be even more efficient and reliable. The disclosure also relates to a method for ejecting fuel in a fuel tank system of a vehicle with a fuel ejector assembly, where a first flow of fuel is disposed in a first fluid passage of the fuel ejector assembly around a nozzle opening, where the nozzle opening is arranged inside the first fluid passage such that the first flow of fuel in the first fluid passage is flowing around the nozzle opening. Further, the disclosure relates to a vehicle comprising a fuel ejector assembly.

The term connected typically means that a component is in operative relation to another component, either directly or indirectly. The term fuel as used herein typically refers to petrol or gasoline, although the fuel may also refer to diesel or any other fuel types suitable for vehicle engines.

Although the disclosure will be described in relation to a car, the disclosure is not restricted to this particular vehicle, but may also be used in other type of vehicles such as for example trucks, buses, construction equipment, industrial construction machines, and wheel loaders.

BRIEF DESCRIPTION OF DRAWINGS

The disclosure will be described in greater detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
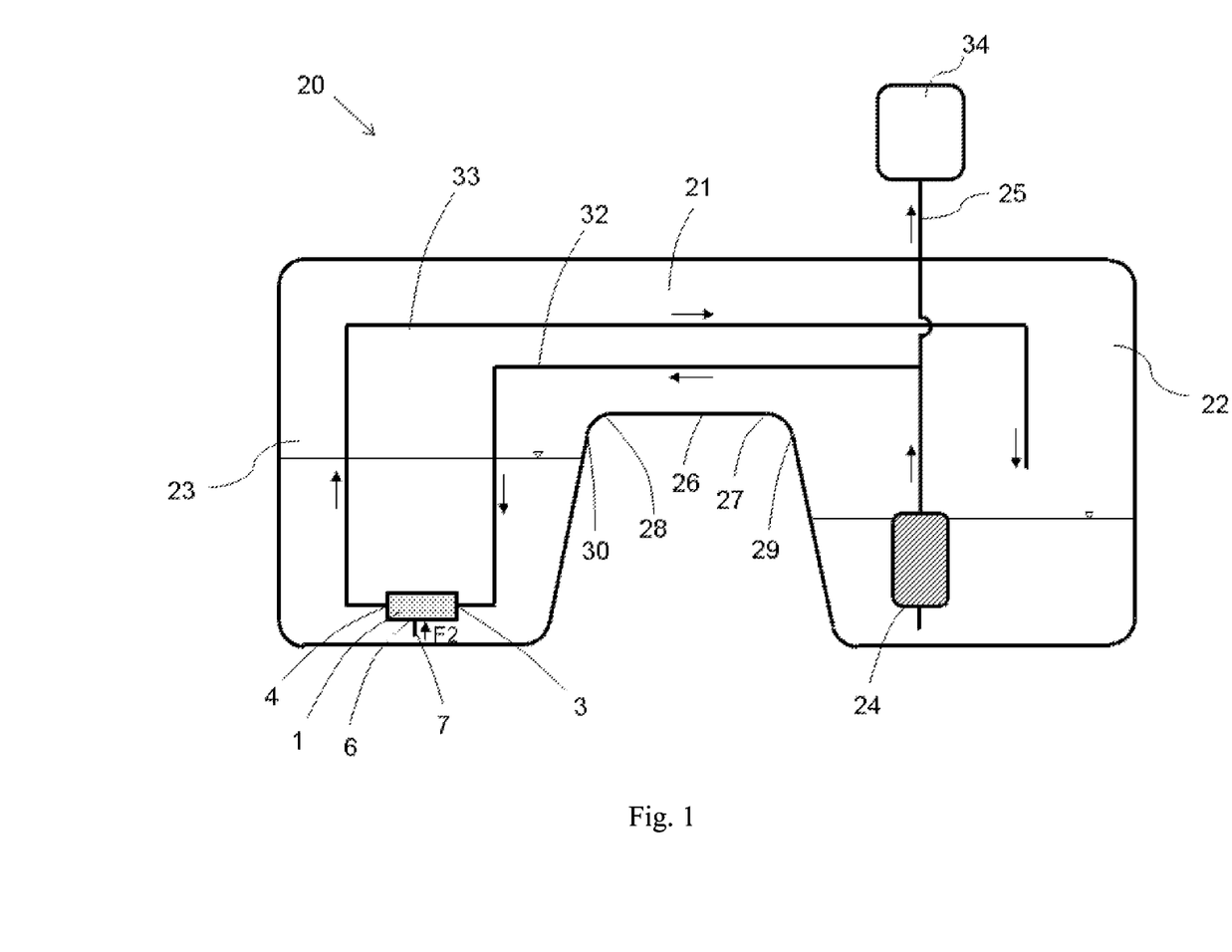
FIG. 1 shows schematically, a fuel tank system including a fuel ejector assembly according to the disclosure.

FIG. 1 schematically shows an example embodiment of a fuel tank system 20 for a vehicle comprising a fuel tank 21 for storing fuel that is used to power an engine or engine system 34 of the vehicle. The engine system 34 includes the engine of the vehicle, and the engine comprises one or more cylinders. The components of the engine system 34 as well as their functions and configurations in the engine system 34 are well-known in the art, and therefore not further described.

A fuel pump 24 is arranged for supplying fuel to the engine system 34. Fuel tank systems for vehicles can be designed in different ways depending on the type of vehicle, fuel and fuel tank used. The fuel tank 21 according to this embodiment is a saddle-type fuel tank, which comprises a first fuel tank compartment 22 in fluid communication with a second fuel tank compartment 23 via a bridge 26. Saddle fuel tanks are well-known in the art and are widely used for automotive applications. They are most frequently used with rear and four wheel drive vehicles and they are often designed to hold more fuel than a standard fuel tank. However, saddle fuel tanks may be used wherever suitable in different vehicle applications. The vehicle may for example be a car. However, the fuel tank system may also be installed and arranged in other types of vehicles. The fuel tank 21 may be manufactured in any suitable material such as for example plastic materials, composites, or metals, depending on the design of the fuel tank system.

In a saddle tank configuration, the first fuel tank compartment 22 and the second fuel tank compartment 23 are extending below the bridge 26 as shown in FIG. 1. In this way, fuel can be stored in the respective fuel tank compartments and there might be a need to transport the fuel from one of the fuel tank compartments to the other, for example if the fuel pump is located in one of the fuel tank compartments. The saddle tank design may for example be used if the fuel tank is placed above the drive shaft of the vehicle.

As further shown in FIG. 1, the first fuel tank compartment 22 is connected to the second fuel tank compartment 23 via the bridge 26. The bridge 26 has a first end part 27 and a second end part 28. The first fuel tank compartment 22 and the second fuel tank compartment 23 are in fluid communication with each other via the bridge 26. The first end part 27 of the bridge 26 is connected to a first upper part 29 of the first fuel tank compartment 22, and the second end part 28 of the bridge 26 is connected to a second upper part 30 of the second fuel tank compartment 23. As described above, the first and second fuel tank compartments are in fluid communication with each other, so that fuel can flow between the fuel tank compartments, which may depend on the driving conditions of the vehicle and the fill levels of fuel in the respective fuel tank compartments. If the level of fuel is high in the compartments, fuel may more easily flow between the fuel tank compartments, for example when the vehicle is driving on a bumpy road surface, in slopes or curves, or when the vehicle is accelerating and decelerating. When the fuel tank 21 is full, the fuel will be stored in the first fuel tank compartment 22, the second fuel tank compartment 23 and the bridge 26. When the fuel level is low in the fuel tank 21, it is desired to distribute as much fuel as possible to the first fuel tank compartment 22, where the fuel pump 24 is located. The distribution of fuel to the first fuel tank compartment 22 may for example be controlled by a suitable control unit.

The fuel pump 24 is arranged in the fuel tank 21 for pumping fuel to the engine system 34 of the vehicle via an engine fuel line 25. The fuel pump 24 may be of any conventional type suitable for the vehicle's engine system 34. As shown in FIG. 1, the fuel pump 24 is arranged in the first fuel tank compartment 22, which sometimes is denoted the active fuel tank compartment, since the fuel pump 24 is actively pumping fuel from the fuel tank compartment where it is located to the engine system 34. As an alternative, the fuel pump 24 may instead be located in the second fuel tank compartment 23, which then becomes the active fuel tank compartment. The fuel tank compartment, where the fuel pump 24 is not located may be referred to as the passive fuel tank compartment, which in FIG. 1 is the second fuel tank compartment 23.

The fuel tank system 20 further comprises a fuel ejector assembly 1, as shown in FIG. 1, where the fuel ejector assembly has an inlet flow port 3, an outlet flow port 4 and a suction flow port 6. The fuel ejector assembly 1 is arranged in the second fuel tank compartment 23 for transporting fuel from the second fuel tank compartment 23 to the first fuel tank compartment 22. A high pressure fuel line 32 is connected to the fuel pump 24 and the inlet flow port 3 so that fluid communication is established between the fuel pump 24 and the inlet flow port 3. In this way, pressurized fuel can flow from the fuel pump 24 to the inlet flow port via the high pressure fuel line 32. The high pressure fuel line 32 can be made of any suitable material used for transporting fuels, such as for example plastic materials, reinforced rubber or polymeric materials, composite materials, and metals.

An outlet fuel line 33 is connected to the outlet flow port 4 of the fuel ejector assembly 1. The outlet fuel line 33 is establishing fluid communication between the outlet flow port 4 and the first fuel tank compartment 22 so that fuel can be distributed from the second fuel tank compartment 23 to the first fuel tank compartment 22 via the outlet fuel line 33. The outlet fuel line 33 can be made of any suitable material used for transporting fuels, such as for example plastic materials, reinforced rubber or polymeric materials, composite materials, and metals.

A fuel tank suction passage 7 is connected to the suction flow port 6, and the fuel tank suction passage 7 is establishing fluid communication between the second fuel tank compartment 23 and the suction flow port 6. Fuel can thus be sucked from the second fuel tank compartment 23 into the suction flow port 6 of the fuel ejector assembly 1 through the fuel tank suction passage 7. The fuel tank suction passage 7 may depending on the design of the fuel tank system 20 be constructed as a pipe or hose, which is guiding the fuel into the fuel ejector assembly 1. The fuel tank suction passage 7 may be arranged as a separate unit attached to the suction flow port 6 of the fuel ejector assembly 1 or integrated within the structure of the fuel ejector assembly 1. The fuel tank suction passage 7 can be made of any suitable material used for transporting fuels, such as for example plastic materials, reinforced rubber or polymeric materials, composite materials, and metals.

When the fuel ejector assembly 1 is operated, the pressurized fuel from the fuel pump 24 will flow into the fuel ejector assembly 1 and establish a suction effect in the suction flow port 6. Fuel stored in the second fuel tank compartment 23 can then be sucked into the fuel ejector assembly 1 and further distributed to the fuel pump 24 arranged in the first fuel tank compartment 22. In this way, the fuel in the fuel tank 21 is transported between the fuel tank compartments so that the pump 24 can distribute enough fuel needed for the engine system 34. The operation and configuration of the fuel ejector assembly will be further described below.

The fuel tank system 20 may also include fuel filters and other parts needed for the system to function in a desired way. The fuel tank system may also include a so called fuel evaporation purge (EVAP) system for preventing fuel vapor in the fuel tank from escaping into the atmosphere, since it should be noted that a fuel system is typically not allowed to leak more fuel vapor in the atmosphere than legislations permit.

Figure 2A:
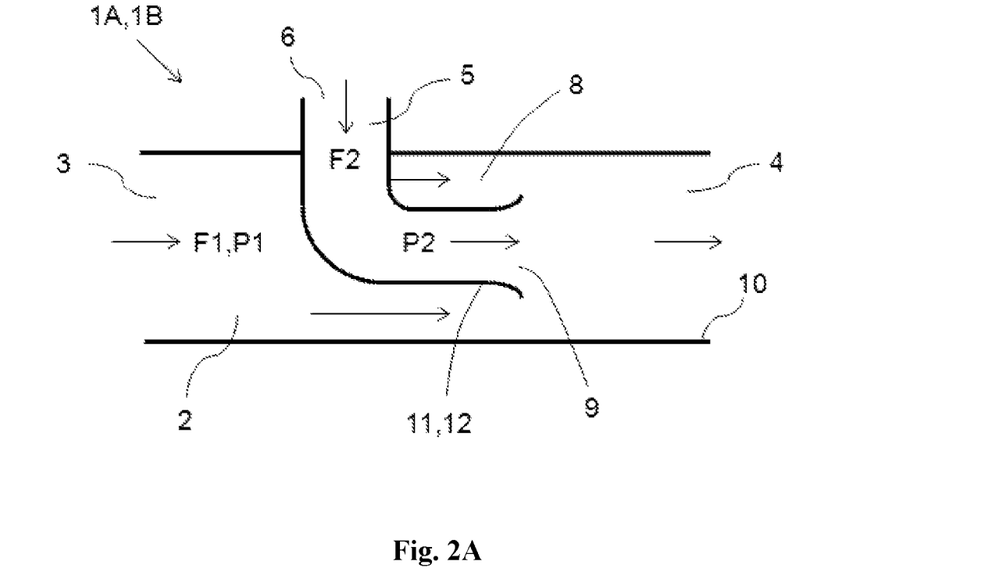
FIG. 2A-B show schematically, example embodiments of a fuel ejector assembly according to the present disclosure.

In FIG. 2A, a fuel ejector assembly 1 for a vehicle according to one embodiment of the disclosure is shown. The fuel ejector assembly 1 comprises a first fluid passage 2 having an inlet flow port 3 and an outlet flow port 4 in fluid communication with each other, enabling a first flow of fuel F1 to flow in the first fluid passage 2. The first fluid passage 2 is adapted to transport fluids, such as the first flow of fuel F1, and unless the first fluid passage 2 is restricted by a valve or other means, the first fluid passage 2 is capable of transporting fluids in both directions between the inlet flow port 3 and the outlet flow port 4. The first fluid passage 2 is arranged for guiding a pressurized stream of fuel from the fuel pump 24, which stream of fuel is flowing from the inlet flow port 3 in a direction towards the outlet flow port 4. The first fluid passage 2 may be arranged as a pipe structure in which the pressurized fuel is flowing. The inlet flow port 3 is arranged to be in fluid communication with the fuel pump 24 via the high pressure fuel line 32. In this way, a part of the pressurized fuel from the fuel pump 24 is guided through the high pressure fuel line 32 and further through the first fluid passage 2 of the fuel ejector assembly 1. The outlet flow port 4 is arranged to be in fluid communication with the outlet fuel line 33, which is distributing fuel from the second fuel tank compartment 23 to the first fuel tank compartment 22, as shown in FIG. 1, so that fuel can be distributed from the second fuel tank compartment 23 to the first fuel tank compartment 22. However, this example is only one of many possible examples of a fluid connection between the various components of the system. The first flow of fuel F1 in the first fluid passage 2 may be regarded as the motive fluid in the fuel ejector assembly 10 having a first pressure level P1, essentially corresponding to the fuel pressure level that is delivered from the fuel pump 24. The first pressure level P1 may vary depending on the fuel pump type used in the fuel system.

A second fluid passage 5 is connected to the first fluid passage 2. The second fluid passage 5 has a suction flow port 6, arranged outside the first fluid passage 2, and a nozzle opening 9, where the suction flow port 6 and the outlet flow port 4 are in fluid communication with each other. The second fluid passage 5 is arranged for guiding a second flow of fuel F2, which is flowing in a direction from the suction flow port 6 through the nozzle opening 9 towards the outlet flow port 4. The second fluid passage 5 may be arranged as a pipe structure in which the second flow of fuel F2 is flowing. The suction flow port 6 is connectable to the fuel tank suction passage 7, enabling the second flow of fuel F2 to flow in the second fluid passage 5 from the fuel tank suction passage 7 via the suction flow port 6 to the outlet flow port 4. The outlet flow port 4 is as described above arranged to be in fluid communication with the outlet fuel line 33, as shown in FIG. 1, so that the second flow of fuel F2 through the second fluid passage 5 may flow from the second fuel tank compartment 23 to the first fuel tank compartment 22. The second fluid passage 5 is thus arranged for distributing fuel from the second fuel tank compartment 23 to the first fuel tank compartment 22 via the outlet fuel line 33.

The first flow of fuel F1 in the first fluid passage 2 is mixed with the second flow of fuel F2 from the second fluid passage 5 after the nozzle opening 9. The mixing of the first flow of fuel F1 and the second flow of fuel F2 will thus take place within the first fluid passage 2 and the mixed fluids will be further transported through the outlet flow port 4.

A flow shape unit 8 is disposed within the first fluid passage 2 between the inlet flow port 3 and the outlet flow port 4, and the flow shape unit 8 is configured to raise the flow velocity of the first flow of fuel F1 flowing in a direction from the inlet flow port 3 to the outlet flow port 4 when the first pressure level P1 is applied to the inlet flow port 3 by the fuel pump 24, thereby subjecting the second fluid passage 5 to a second pressure level P2. The second pressure level P2 is due to the Venturi effect lower than the first pressure level P1. This effect is well known in the art and is commonly used in different ejector applications. The system is designed so that under pressure from the fuel pump 24, the second pressure level P2 is lower than the pressure level in the fuel tank 21 and in the fuel tank suction passage 7, and in this way fuel is sucked from the second fuel tank compartment 23, via the fuel tank suction passage 7 through the second fluid passage 5. The second flow of fuel F2 in the second fluid passage 5 may be regarded as a suction fluid in the fuel ejector assembly 1 having the second pressure level P2. The first pressure level P1 may as described above vary depending on the type of fuel pump used in the fuel system and also depending on other components used. The fuel ejector assembly 1 may be based on different fuel tank system parameters be designed so that a suitable second pressure level P2 is achieved.

The flow of fuel from the fuel pump 24 to the fuel ejector assembly 1 through the high pressure flow line 32 may be controlled by a suitable valve arrangement. Other valve arrangements for controlling the flow of fuel in the different parts of the fuel tank system may also be provided. The first fuel tank compartment 22 and the second fuel tank compartment 23 may also be provided with fuel level sensors so that the flow of fuel from the second fuel tank compartment 23 to the first fuel tank compartment 22 can be controlled in a desired way, for example by using a control unit, which is controlling the flow of fuel, valves and other components of the fuel tank system.

The second fluid passage 5 is extending into the first fluid passage 2 so that the nozzle opening 9 is arranged inside the first fluid passage 2 facing the outlet flow port 4 such that the first flow of fuel F1 in the first fluid passage 2 is flowing around the nozzle opening 9. As shown in FIG. 2A, the flow shape unit 8 is disposed within the first fluid passage 2 in connection to the nozzle opening 9.

The first flow of fuel F1 in the first fluid passage 2 is flowing around the nozzle opening 9 along an inner wall 10 of the first fluid passage 2. The nozzle opening 9 has an essentially circular cross-sectional shape and the inner wall 10 of the first fluid passage 2 has an essentially circular cross-sectional shape. In this way, the first flow of fuel F1 in the first fluid passage 2 may be arranged so that it has an essentially annular cross-sectional shape when flowing around the nozzle opening 9, in the annular gap formed between the nozzle opening 9 and the inner wall 10, with a flow direction along the first fluid passage 2 from the inlet flow port 3 towards the outlet flow port 4. Tests have shown that the flow of fuel with annular cross-sectional shape around the nozzle opening 9 establishes a highly efficient suction effect in the second fluid passage 5. In this way, fuel in the second fuel tank compartment 23 can be sucked into the fuel ejector assembly 1 in an efficient way with low energy consumption, with this specific design of the fuel ejector assembly 1. Low energy usage in the fuel ejector assembly 1 is important in order to support the lowering of the total emissions from the vehicle.

The flow shape unit 8 comprises a converging part 11, which is configured to raise the flow velocity of the first flow of fuel F1 from the inlet flow port 3 to the outlet flow port 4. As shown in FIG. 2A, the converging part 11 may be formed by an end portion 12 of the second fluid passage 5 extending into the first fluid passage 2. Due to the pipe-like configuration of the second fluid passage 5, the end portion 12 may as an example be funnel-shaped in order to form the converging part 11, as shown in FIG. 2A, where the end portion 12 forming the nozzle opening 9 in a cross-sectional view is widened in a curve towards the inner wall 10 of the first fluid passage 2.

When the fuel ejector assembly 1 is operated under pressure conditions from the fuel pump 24, pressurized fuel is flowing from the fuel pump 24 through the high pressure fuel line 32 and further into the inlet flow port 3 of the first fluid passage 2, as shown in FIG. 1. As described above, the pressure from the fuel pump 24 is establishing the first flow of fuel F1 with the first pressure level P1 in the first fluid passage 2, and the first flow of fuel F1 entering the first fluid passage 2 is the motive fluid that is operating the fuel ejector assembly 1 under pressurized conditions. When the first flow of fuel F1 is reaching the flow shape unit 8, the velocity of the first flow of fuel F1 increases and due to this effect the second pressure level P2 is established in the second fluid passage 5. In this way, fuel can be sucked from the second fuel tank compartment 23 and flow through the fuel tank suction passage 7 and further into the suction flow port 6 of the second fluid passage 5. The second flow of fuel F2 will exit the second fluid passage 5 when reaching the nozzle opening 9, and after the nozzle opening 9, the first flow of fuel F1 in the first fluid passage 2 will mix with the second flow of fuel F2 from the second fluid passage 5, and the mixed fluids will flow out from the first fluid passage 2 through the outlet flow port 4 and further to the outlet fuel line 32 arranged between the second fuel tank compartment 23 and the first fuel tank compartment 22. The first flow of fuel F1 is thus disposed in the first fluid passage 2 of the fuel ejector assembly 1 around the nozzle opening 9, where the nozzle opening 9 is arranged inside the first fluid passage 2 such that the first flow of fuel F1 in the first fluid passage 2 is flowing around the nozzle opening 9. The mixed fluids will be transported to the first fuel tank compartment.

Figure 2B:
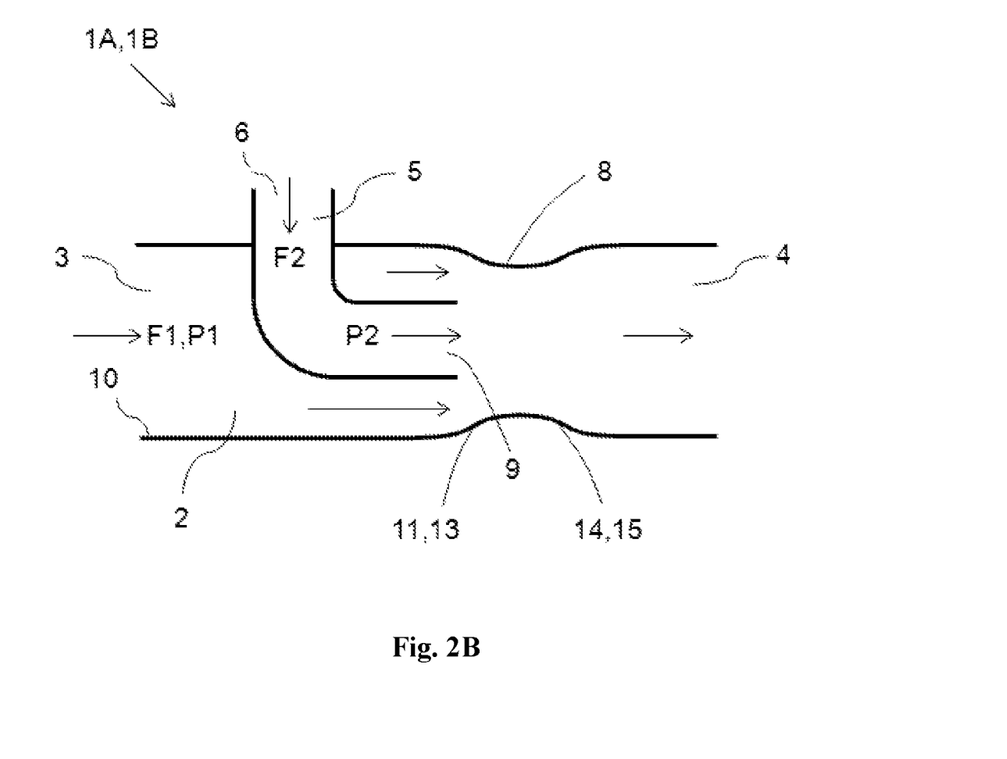

In FIG. 2B, an alternative embodiment of the fuel ejector assembly 1 is shown. The fuel ejector assembly 1 comprises a first fluid passage 2 having an inlet flow port 3 and an outlet flow port 4 in fluid communication with each other, enabling a first flow of fuel F1 to flow in the first fluid passage 2. A second fluid passage 5 is connected to the first fluid passage 2, and the second fluid passage 5 has a suction flow port 6 arranged outside the first fluid passage 2 and a nozzle opening 9. The suction flow port 6 and the outlet flow port 4 are in fluid communication with each other, and the suction flow port 6 is connectable to a fuel tank suction passage 7 enabling a second flow of fuel F2 to flow in the second fluid passage 5 from the fuel tank suction passage 7 via the suction flow port 6 to the outlet flow port 4. A flow shape unit 8 is disposed within the first fluid passage 2 between the inlet flow port 3 and the outlet flow port 4, and the flow shape unit 8 is configured to raise the flow velocity of the first flow of fuel F1 flowing in a direction from the inlet flow port 3 to the outlet flow port 4 when a first pressure level P1 is applied to the inlet flow port 3, thereby subjecting the second fluid passage 5 to a second pressure level P2, which is lower than the first pressure level P1. The second fluid passage 5 is extending into the first fluid passage 2 so that the nozzle opening 9 is arranged inside the first fluid passage 2 facing the outlet flow port 4 such that the first flow of fuel F1 in the first fluid passage 2 is flowing around the nozzle opening 9, and the flow shape unit 8 is as shown in FIG. 2B disposed within the first fluid passage 2 in connection to the nozzle opening 9.

The first flow of fuel F1 in the first fluid passage 2 is flowing around the nozzle opening 9 along an inner wall 10 of the first fluid passage 2. The nozzle opening 9 may have an essentially circular cross-sectional shape. Further, the inner wall 10 of the first fluid passage 2 may have an essentially circular cross-sectional shape, so that the first flow of fuel F1 in the first fluid passage 2 can be arranged to flow essentially annularly around the nozzle opening 9 in a direction along the first fluid passage 2 from the inlet flow port 3 towards the outlet flow port 4.

The flow shape unit 8 comprises a converging part 11 configured to raise the flow velocity of the first flow of fuel F1 from the inlet flow port 3 to the outlet flow port 4. The converging part 11 is in this embodiment formed by a pipe contraction 13 inside the first fluid passage 2. Further, the flow shape unit 8 may also comprise a diverging part 14 arranged in the flow direction after the converging part 11, as shown in FIG. 2B. The diverging part 14 may be formed by a pipe expansion 15 within the first fluid passage 2. The converging part 11 and the diverging part 14 are in a conventional way used to control the flow in the first fluid passage 2. The pipe contraction 13 may for example be formed through shaping of the inner wall 10 of the first fluid passage 2, as shown in FIG. 2B. The first fluid passage 2 may thus simply in the forming process be shaped into the desired configuration so that the pipe contraction 13 is part of the wall structure of the first fluid passage 2. In the same way, the pipe expansion 15 may also be formed through shaping of the inner wall 10 of the first fluid passage 2. As an alternative, the pipe contraction 13 and the pipe expansion 15 may be formed of a separate piece of material, which is inserted into the first fluid passage 2.

The different embodiments of the fuel ejector assembly 1 may further comprise a first valve disposed in the first fluid passage 2 at a position in-between the inlet flow port 3 and the flow shape unit 8. The first valve is configured to permit fluid to flow through the first valve from the inlet flow port 3 towards the flow shape unit 8, while restricting fluid to flow through the first valve from the flow shape unit 8 towards the inlet flow port 3. A second valve may be disposed in the second fluid passage 5. The second valve is configured to permit fluid to flow through the second valve from the suction flow port 6 towards the outlet flow port 4, while restricting fluid to flow through the second valve from the outlet flow port 4 towards the suction flow port 6. The first and second valves can for example be check valves or other suitable types of valves or valve units. Also, it should be noted that unless the second fluid passage 5 is restricted by a valve or other means, the second fluid passage 5 is capable of transporting fluid in both directions between the suction flow port 6 and the outlet flow port 4.

When the fuel pump 24 is delivering pressurized fuel to the fuel ejector assembly via the high pressure fuel line 32, the fuel ejector assembly 1 is subjected to the first pressure level P1, and the first flow of fuel F1 is flowing through the first fluid passage 2 in a direction from inlet flow port 3 towards the outlet flow port 4. Hereby, the second pressure level P2 is created in the second fluid passage 5 due to the configuration of the flow shape unit 8, and the second pressure level P2 enables fuel to be sucked into the second fluid passage 5. The pressurized first flow of fuel F1 in the first fluid passage 2 is indicated by arrows in FIGS. 2A and 2B. The second flow of fuel F2 in the second fluid passage 5 is indicated by arrows in FIGS. 2A and 2B.

From the above description of the example embodiments of the fuel ejector assembly 1, the fuel ejector assembly 1 provides the possibility of distributing fuel within the fuel tank 21. In this manner, it becomes possible to further improve existing operations of the fuel tank system. In particular, the present disclosure provides a fuel ejector assembly 1 capable of efficiently controlling the fuel flow, and as such the example embodiments of the present disclosure improve the general performance of the fuel ejector assembly 1.

The fuel ejector assembly 1 may be constructed as a separate single unit which is mounted within the fuel tank system of the vehicle. In this way, the functions of the fuel ejector assembly 1 may be integrated within one single unit. Such a single unit may be an assembled single unit, which is formed of different parts, including necessary flow channels and valves. The fluid passages and the flow shape unit may be constructed of any suitable material, such as for example plastic materials, composite materials, and metals.

Figure 3:
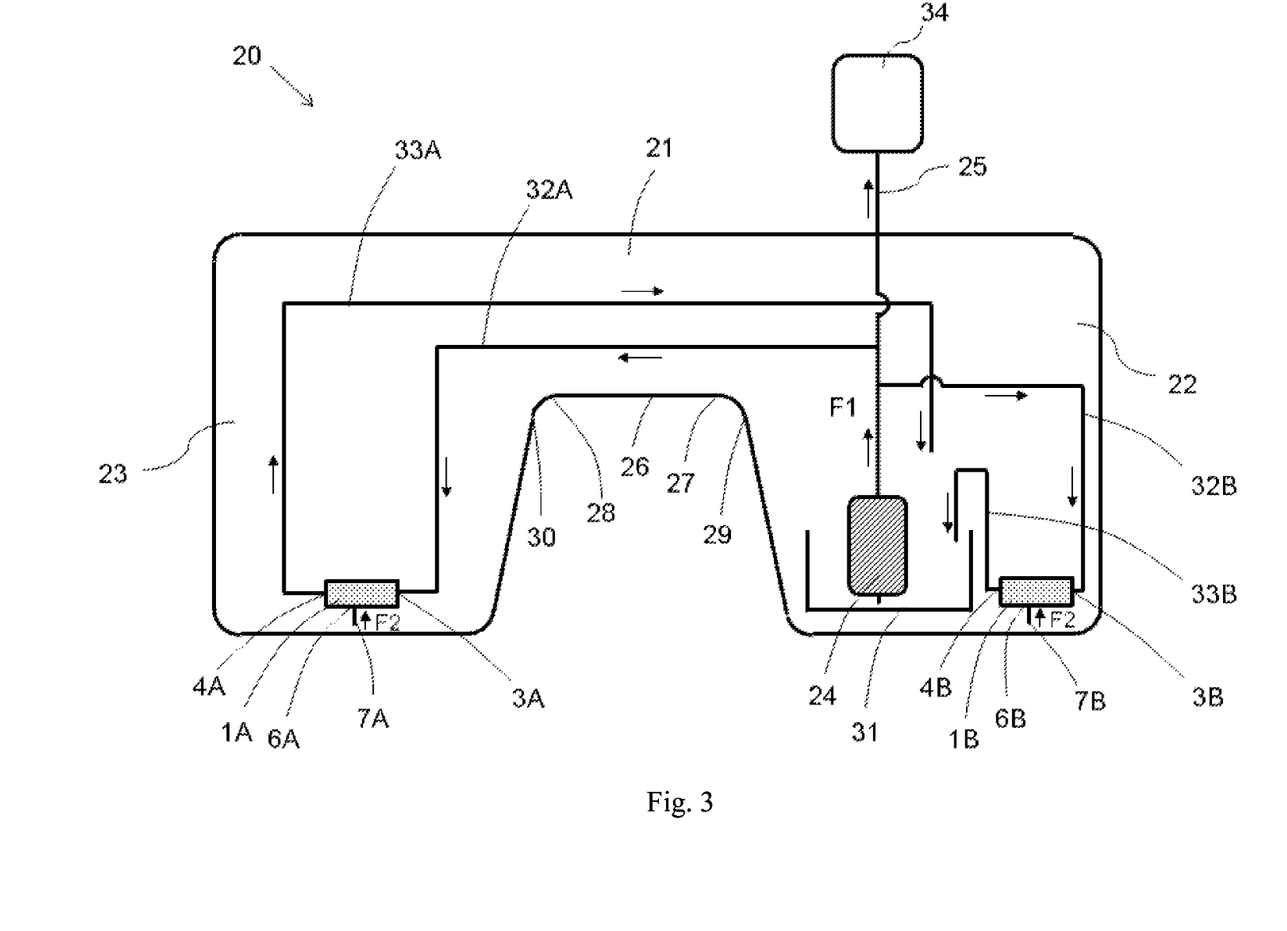
FIG. 3 shows schematically, an alternative embodiment of a fuel tank system including a fuel ejector assembly according to the disclosure.

An alternative embodiment of the fuel tank system 20 for a vehicle is shown in FIG. 3, where the fuel tank system 20 comprises two fuel ejector assemblies. The fuel ejector assemblies may be constructed in accordance with the embodiments described above. However, it is not necessary that both fuel ejector assemblies are of the same type. The fuel tank system may thus have two different types of fuel ejectors, where one may be of the configuration as shown in relation to FIG. 2A and the other of the configuration as shown in FIG. 2B. Other constructions or configurations may also be possible within the scope of the disclosure.

In the embodiment shown in FIG. 3, the fuel tank system 20 comprises a fuel tank 21 for storing fuel that is used to power an engine system 34 of the vehicle. The fuel tank 21 comprises a first fuel tank compartment 22 in fluid communication with a second fuel tank compartment 23, in the same way as described in the embodiment above. A first fuel ejector assembly 1A has a first inlet flow port 3A, a first outlet flow port 4A and a first suction flow port 6A, and the first fuel ejector assembly 1A is arranged in the second fuel tank compartment 23 for transporting fuel from the second fuel tank compartment 23 to the first fuel tank compartment 22. A fuel pump 24 is arranged in the first fuel tank compartment 22 of the fuel tank 21 for pumping fuel to the engine system 34 of the vehicle via an engine fuel line 25. A first high pressure fuel line 32A is connected to the fuel pump 24 and the first inlet flow port 3A, and the first high pressure fuel line 32A is establishing fluid communication between the fuel pump 24 and the first inlet flow port 3A. A first outlet fuel line 33A is connected to the first outlet flow port 4A, and the first outlet fuel line 33A is establishing fluid communication between the first outlet flow port 4A and the first fuel tank compartment 22. A first fuel tank suction passage 7A is connected to the first suction flow port 6A, and the first fuel tank suction passage 7A is establishing fluid communication between the second fuel tank compartment 23 and the first suction flow port 6A.

The first fuel tank compartment 22 is connected to the second fuel tank compartment 23 via a bridge 26 having a first end part 27 and a second end part 28, where the first fuel tank compartment 22 and the second fuel tank compartment 23 are in fluid communication with each other via the bridge 26. The first end part 27 is connected to a first upper part 29 of the first fuel tank compartment 22, and the second end part 28 is connected to a second upper part 30 of the second fuel tank compartment 23.

As readily understood, the components and parts of the fuel tank system 20 so far described in the embodiment shown in FIG. 3 may be the same as or similar to the ones described in the embodiment relating to FIG. 1.

In the embodiment shown in FIG. 3, the fuel tank system 20 further comprises a second fuel ejector assembly 1B. The second fuel ejector assembly 1B has a second inlet flow port 3B, a second outlet flow port 4B and a second suction flow port 6B, and the second fuel ejector assembly 1B is arranged in the first fuel tank compartment 22 for transporting fuel from the first fuel tank compartment 22 to an inner fuel tank cup 31 arranged within the first fuel tank compartment 22. The fuel pump 24 is in this embodiment arranged in the inner fuel tank cup 31 for pumping fuel to the engine system 34 of the vehicle via the engine fuel line 25.

The purpose with the inner fuel tank cup 31 is to secure that fuel is always available for the fuel pump 24, independently of the driving conditions of the vehicle. Through the arrangement with the inner fuel tank cup 31, with a relatively small volume compared to the total volume of the fuel tank 21, the fuel pump 24 will have the possibility to deliver fuel to the engine system even if the vehicle is driving on bumpy road surfaces, in slopes or curves, or when the vehicle is accelerating and decelerating. However, the inner fuel tank cup 31 must be supplied with fuel through a suitable arrangement, and by using the second fuel ejector assembly 1B for this purpose an efficient way of supplying fuel to the inner fuel tank cup 31 is achieved. Further, the inner fuel tank cup 31 may be provided with a fuel level sensor arrangement so that fuel is pumped into the inner fuel tank cup 31 when the fuel level reaches a certain minimum level. The fuel level sensor arrangement may also be configured so that a maximum fill level of the inner fuel tank cup 31 is used for stopping the pumping of fuel into the inner fuel tank cup 31. The fuel level sensor arrangement may be connected to a control unit, which is controlling the flow of fuel, valves and other components of the fuel tank system.

A second high pressure fuel line 32B is connected to the fuel pump 24 and the second inlet flow port 3B, and the second high pressure fuel line 32B is establishing fluid communication between the fuel pump 24 and the second inlet flow port 3B. The fuel pump 24 is thus supplying pressurized fuel to the engine system 34, the first fuel ejector assembly 1A and the second fuel ejector assembly 1B.

A second outlet fuel line 33B is connected to the second outlet flow port 4B, and the second outlet fuel line 33B is establishing fluid communication between the second outlet flow port 4B and the first fuel tank compartment 22. A second fuel tank suction passage 7B is connected to the second suction flow port 6B, and the second fuel tank suction passage 7B is establishing fluid communication between the inner fuel tank cup 31 and the second suction flow port 6B.

It should also be readily understood that the fuel ejector assembly can be installed in other ways and at other locations in the different embodiments of the fuel tank system. It would also be possible to use another source for the pressurized fuel than the fuel pump 24 delivering fuel to the engine system 34, depending on the fuel tank construction.

Other types of pump units may be used instead in order to establish the motive fluid to the fuel ejector assembly 1.

Depending on the fuel tank system and engine system design of the vehicle it would also be possible to construct the fuel tank system with three or more fuel ejector assemblies.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

F1: First flow of fuel
F2: Second flow of fuel
1: Fuel ejector assembly
2: First fluid passage
3: Inlet flow port
4: Outlet flow port
5: Second fluid passage
6: Suction flow port
7: Fuel tank suction passage
8: Flow shape unit
9: Nozzle opening
10: Inner wall
11: Converging part
12: End portion
13: Pipe contraction
14: Diverging part
15: Pipe expansion
20: Fuel tank system
21: Fuel tank
22: First fuel tank compartment
23: Second fuel tank compartment
24: Fuel pump
25: Engine fuel line
26: Bridge
27: First end part
28: Second end part
29: First upper part
30: Second upper part
31: Inner fuel tank cup
32: High pressure fuel line
33: Outlet fuel line
34: Engine system

The invention claimed is:

1. A fuel ejector assembly for a vehicle, comprising:
a first fluid passage having an inlet flow port and an outlet flow port in fluid communication with each other, enabling a first flow of fuel to flow in the first fluid passage;
a second fluid passage connected to the first fluid passage, the second fluid passage having a suction flow port arranged outside the first fluid passage and a nozzle opening, where the suction flow port and the outlet flow port are in fluid communication with each other, wherein the suction flow port is configured for connection to a fuel tank suction passage so that a second flow of fuel flows in the second fluid passage from the fuel tank suction passage via the suction flow port to the outlet flow port; and
a flow shape unit disposed within the first fluid passage between the inlet flow port and the outlet flow port, where the flow shape unit is configured to raise the flow velocity of the first flow of fuel flowing in a direction from the inlet flow port to the outlet flow port when a first pressure level is applied to the inlet flow port, so as to subject the second fluid passage to a second pressure level that is lower than the first pressure level; and
wherein the second fluid passage extends into the first fluid passage and the nozzle opening is arranged inside the first fluid passage facing the outlet flow port such that the first flow of fuel in the first fluid passage flows through a cross-sectional area surrounding the nozzle opening between the nozzle opening and an inner wall of the first fluid passage, and the flow shape unit is disposed within the first fluid passage in connection to the nozzle opening; and
wherein the flow shape unit is comprised of an end portion of the second fluid passage forming the nozzle, the end portion of the second fluid passage radially expands outward toward the inner wall of the first fluid passage relative to a portion of the second fluid passage upstream of the end portion.

2. A fuel ejector assembly according to claim 1, wherein the nozzle opening has an essentially circular cross sectional shape and wherein the inner wall of the first fluid passage has an essentially circular cross-sectional shape, so that the first flow of fuel in the first fluid passage is flowing essentially annularly around the nozzle opening in a direction along the first fluid passage from the inlet flow port towards the outlet flow port.

3. A fuel ejector assembly according to claim 1, wherein the fuel ejector assembly is an assembled single unit.

4. A fuel tank system for a vehicle comprising:
a first fuel ejector assembly according to claim 1, having an inlet flow port, an outlet flow port and a suction flow port;
a fuel tank for storing fuel, comprising a first fuel tank compartment in fluid communication with a second fuel tank compartment, wherein the first fuel ejector assembly is arranged in the second fuel tank compartment for transporting fuel from the second fuel tank compartment to the first fuel tank compartment;
a fuel pump arranged in the fuel tank for pumping fuel to an engine system of the vehicle via an engine fuel line;
a high pressure fuel line connected to the fuel pump and the inlet flow port establishing fluid communication between the fuel pump and the inlet flow port, an outlet fuel line connected to the outlet flow port establishing fluid communication between the outlet flow port and the first fuel tank compartment; and a fuel tank suction passage connected to the suction flow port establishing fluid communication between the second fuel tank compartment and the suction flow port.

5. A fuel tank system according to claim 4, wherein the first fuel tank compartment is connected to the second fuel tank compartment via a bridge having a first end part and a second end part, where the first fuel tank compartment and the second fuel tank compartment are in fluid communication with each other via the bridge, wherein the first end part is connected to a first upper part of the first fuel tank compartment, and where the second end part is connected to a second upper part of the second fuel tank compartment.

6. A fuel tank system according to claim 4, wherein the fuel tank system further has a second fuel ejector assembly, where the second fuel ejector assembly is arranged in the first fuel tank compartment for transporting fuel from the first fuel tank compartment to an inner fuel tank cup arranged within the first fuel tank compartment, and where the fuel pump is arranged in the inner fuel tank cup.

7. A method for ejecting fuel in a fuel tank system of a vehicle with a fuel ejector assembly according to claim 1, wherein the method comprises the step:

disposing a first flow of fuel in a first fluid passage of the fuel ejector assembly around a nozzle opening, where the nozzle opening is arranged inside the first fluid passage such that the first flow of fuel in the first fluid passage is flowing around the nozzle opening.

8. A vehicle, wherein the vehicle comprises a fuel ejector assembly according to claim 1.

9. A fuel ejector assembly for a vehicle, comprising:

a first fluid passage having an inlet flow port and an outlet flow port in fluid communication with each other, enabling a first flow of fuel to flow in the first fluid passage;

a second fluid passage connected to the first fluid passage, the second fluid passage having a suction flow port arranged outside the first fluid passage and a nozzle opening, where the suction flow port and the outlet flow port are in fluid communication with each other, wherein the suction flow port is configured for connection to a fuel tank suction passage so that a second flow of fuel flows in the second fluid passage from the fuel tank suction passage via the suction flow port to the outlet flow port; and a flow shape unit disposed within the first fluid passage between the inlet flow port and the outlet flow port, where the flow shape unit is configured to raise the flow velocity of the first flow of fuel flowing in a direction from the inlet flow port to the outlet flow port when a first pressure level is applied to the inlet flow port, so as to subject the second fluid passage to a second pressure level that is lower than the first pressure level; and wherein the second fluid passage has a portion inside the first fluid passage that extends parallel to the first fluid passage, the portion of the second fluid passage having a constant diameter along its length and the nozzle opening is a terminal end of the portion of the second fluid passage that has the same diameter as the portion of the second fluid passage; and wherein the second fluid passage extends into the first fluid passage and the nozzle opening is arranged inside the first fluid passage facing the outlet flow port such that the first flow of fuel in the first fluid passage flows through a cross-sectional volume surrounding the portion of the second fluid passage and the nozzle opening between the second fluid passage and an inner wall of the first fluid passage, and the flow shape unit is disposed within the first fluid passage in connection to the nozzle opening; and wherein the flow shape unit is comprised of a constriction of the first fluid passage.

10. A fuel tank system for a vehicle comprising:

a first fuel ejector assembly according to claim 9, having an inlet flow port, an outlet flow port and a suction flow port;

a fuel tank for storing fuel, comprising a first fuel tank compartment in fluid communication with a second fuel tank compartment, wherein the first fuel ejector assembly is arranged in the second fuel tank compartment for transporting fuel from the second fuel tank compartment to the first fuel tank compartment;

a fuel pump arranged in the fuel tank for pumping fuel to an engine system of the vehicle via an engine fuel line;

a high pressure fuel line connected to the fuel pump and the inlet flow port establishing fluid communication between the fuel pump and the inlet flow port, an outlet fuel line connected to the outlet flow port establishing fluid communication between the outlet flow port and the first fuel tank compartment; and a fuel tank suction passage connected to the suction flow port establishing fluid communication between the second fuel tank compartment and the suction flow port.

11. A fuel tank system according to claim 9, wherein the first fuel tank compartment is connected to the second fuel tank compartment via a bridge having a first end part and a second end part, where the first fuel tank compartment and the second fuel tank compartment are in fluid communication with each other via the bridge, wherein the first end part is connected to a first upper part of the first fuel tank compartment, and where the second end part is connected to a second upper part of the second fuel tank compartment.

12. A fuel tank system according to claim 9, wherein the fuel tank system further has a second fuel ejector assembly, where the second fuel ejector assembly is arranged in the first fuel tank compartment for transporting fuel from the first fuel tank compartment to an inner fuel tank cup arranged within the first fuel tank compartment, and where the fuel pump is arranged in the inner fuel tank cup.

13. A vehicle, wherein the vehicle comprises a fuel ejector assembly according to claim 9.

* * * * *